United States Patent [19]

Vegh et al.

[11] 4,011,805
[45] Mar. 15, 1977

[54] CONVECTION STEAMER APPARATUS AND METHOD FOR PROCESSING FOOD ITEMS OR THE LIKE

[75] Inventors: Elmer S. Vegh, Lyndhurst; William F. Castle, Cleveland; Leonard P. Hadbavny, Olmsted Falls; Donald F. Klier, Parma; David S. Schwerzler, Cleveland, all of Ohio

[73] Assignee: Alco Standard Corporation, Cleveland, Ohio

[22] Filed: Feb. 19, 1975

[21] Appl. No.: 550,973

[52] U.S. Cl. .................................. 99/467; 99/417; 99/474; 126/369; 261/DIG. 10; 426/510
[51] Int. Cl.² .................... F24D 1/00; A47J 27/04; A47J 27/16
[58] Field of Search ............ 99/324, 417, 467, 473, 99/474; 126/348, 369; 426/510, 511; 261/DIG. 10; 239/553.3

[56] References Cited
UNITED STATES PATENTS

| | | | |
|---|---|---|---|
| 318,225 | 5/1885 | Alberger et al. ........... 261/DIG. 10 |
| 2,389,270 | 11/1945 | Miller ............... 239/553.3 |
| 3,503,322 | 3/1970 | Mccready ................... 99/324 |
| 3,769,958 | 11/1973 | Kozinczuk .................... 99/467 |
| 3,823,661 | 7/1974 | Kells ................................ 99/468 |

Primary Examiner—Steven L. Stephan
Attorney, Agent, or Firm—Teare, Teare & Sammon

[57] ABSTRACT

A convection steamer apparatus and method having improved heat-transfer characteristics for rapidly and effectively processing food items or the like at atmospheric pressure and at a relatively low constant steam temperature comprising a steam generator and distribution system for delivering steam in a turbulent controlled path to a heating chamber. A diffuser device acts to introduce substantially dry steam into the distribution system and a pressure differential generator device communicates with the chamber for continuously inducing a pressure differential to continuously purge air and/or unused steam from said chamber to maintain turbulent, generally orbital flow of dry steam in heat-transfer relation around the food items to be processed.

The invention further contemplates an improved construction for an atmospheric closure for fluid and heat sealing of the heating chamber during the processing of such food items or the like.

12 Claims, 12 Drawing Figures

CONVECTION STEAMER APPARATUS AND METHOD FOR PROCESSING FOOD ITEMS OR THE LIKE

BACKGROUND OF THE INVENTION

The present invention relates to cooking apparatus, and more particularly relates to a unique convection steam apparatus and method for processing food items or the like with improved convection heat-transfer characteristics for more rapid and effective heating and/or cooking with high quality food characteristics, such as color, texture, flavor and taste. The apparatus and method of convection may be utilized for processing any raw and/or pre-cooked food items. The convection steamer and method of the present invention is particularly useful in commercial applications, such as restaurants, cafeterias, or the like, where quality and relatively rapid processing of considerable amounts of food items is desirable.

Heretofore, various types of steam cookers have been employed to increase the speed of cooking while attempting to retain the important criteria of food quality usually impaired by either under or over cooking. Steam cooking has been recognized as an effective process compared to dry heat cooking for the reason that, when steam contacts any surface temperature lower than itself, the steam condenses and transfers a comparatively vast amount of heat to the cooler surface (970 B.T.U./pound of steam). Moreover, prior cooking methods have not effectively overcome traditional barriers for optimum heat transfer. One such barrier is air; condensate is another. For example, the presence of only one half of one percent of air in the steam environment can reduce the heat transfer coefficient by as much as 50% for the reason that air acts as an insulative barrier around the food. Further, a cooking chamber containing an air/steam mixture can only supply the temperature of the partial pressure of the steam and not the total chamber pressure since the heat transfer coefficient of the pressurized air/steam environment is considerably less efficient than an atmospheric pure steam environment. Similarly, condensate forms on the food and insulates it against efficient heat transfer. In general, prior cooking methods have not utilized the maximum potential cooking energy of steam which is maintained at atmospheric pressure and at its lowest effective cooking temperature. Typical of prior art apparatus and methods are disclosed in the following patents; U.S. Pat. Nos. 3,071,063; 3,742,931; 3,071,473; 3,769,958; 3,503,322; 3,820,524.

SUMMARY OF THE INVENTION

The present invention contemplates the provision of a convection steamer and method for processing foods or the like, such as by cooking, heating, thawing or reconstituting, at substantially atmospheric pressure and at a relatively low effective steam cooking temperature comprising a steam generator and distribution system operative with the diffuser device for delivering substantially dry steam into a chamber and in a controlled, turbulent path around the food items to be processed. A pressure differential generator means in the form of hydro-siphonic device communicates with said chamber for continuously purging air and/or unused steam from the chamber via a negative pressure to maintain a controlled turbulent, flow of substantially dry steam in convection, heat-transfer relation around said food items so as to cook the same at a relatively low effective temperature of approximately 212° in the region around the food being cooked.

By the present arrangement, the controlled turbulent steam flow swirls within the chamber and over and around the food thereby diminishing the condensate which forms to surface. On food items where condensate normally forms as droplets of water, the convection steamer of the present invention provides a predetermined controlled turbulent flow that causes the droplets to combine and run off quickly. By maintaining more of the food surface relatively free of condensate, the amount of heat transferred is significantly increased. On other foods, where condensate forms as a liquid film, the velocity of the turbulence strokes and thins the film to a minimum, often breaking through and greatly increasing the amount of heat-transfer to the food items to be processed. Further, in the present invention, the pressure differential generator means in the form of hydro-siphonic device continuously purges air and/or steam from the chamber so as to counteract the undesirable effect of air in the chamber. The presence of air in the steam chamber, even in very small quantities, greatly reduces the heat-transfer characteristics thereof. As noted, it has been recognized that 0.5% by volume of air in the steam can reduce the efficiency of heat-transfer from the steam by approximately 50%. When air is present in the steam, it is a steam-air mixture that is carried to the cooler food surfaces. The steam condenses on the food, but the air, being non-condensable, remains in an insulative layer around the food. This layer resists the approach of additional steam and thus, the amount of heat transferred is greatly reduced. In the present invention, the hydro-siphonic system is extremely effective in removing air, and consequently, greatly increases the amount of heat transferred to the food items to be processed. It has been noted that many steam and pressure cookers do not adequately purge the air entrapped in the heating chamber and operate with upwards of 10% air depending on the particular apparatus. In the present invention, however, it has been found that only 2% air is present at the start of cooking, which amount rapidly decreases to substantially 0 percent air during the cooking cycle.

In the process of the present invention, a substantially dry, saturated input steam is injected into the chamber at a pressure greater than atmospheric (e.g. 10 p.s.i.g. to 15 p.s.i.g.) and at its corresponding steam temperature. The steam is expanded into said chamber and is simultaneously throttled to substantially zero pressure (e.g., 14.7 p.s.i.a.) to provide a superheated steam vapor. The chamber is maintained at such zero pressure, and due to the forced convection heat-transfer process of the invention, the region around the food — where condensation occurs — is maintained at the lowest effective temperature (e.g., 212° F) during the cooking cycle.

As employed herein, the term "saturated steam" means pure steam at the temperature that corresponds to the boiling temperature of water at the existing pressure. The terms "absolute" and "gage" pressure mean absolute pressure that is pressure in pounds per square inch (psia) above a perfect vacuum. Gage pressure is pressure in pounds per square inch above atmospheric pressure which is 14.7 pounds per square inch absolute. Gage pressure (psig) plus 14.7 equals absolute pressure, for example.

By the previous and following described apparatus and method, there is achieved superior cooking at the lowest effective cooking temperature so as to minimize food damage, to enhance food color and taste, and to retain maximum nutritional values. The dry steam minimizes food shrinkage, does not dilute food nutrients, and is superior to other cooking media. Further, in the present invention, due to the continuous removal of air/or unused unused steam from the cooling chamber, there is provided a reduction in flavor and odor contamination which can result from harmful volatiles, such as acids and other undesirable gases. In addition, by the present invention, the cooking can be carried out more effectively with considerable energy conservation compared to prior methods so that practically all foods, such as vegetables, poultry, seafoods, meats, stews, curries, or the like, can be cooked, defrosted and reheated in an economical manner. Still other advantages include:

a. Foods can't burn, stick, scorch or dry out, and due to the convection steamer process is effectively prevented from being over-cooked;

b. A greater variety and volume of food can be prepared in much less space as required by prior methods;

c. The handling and scrubbing of heavy pots is virtually eliminated;

d. The cooking area will be cooler and more complete, and e. The convection steamer apparatus includes automatic operation and is of a compact and flexible construction (e.g., free standing, counter or table tops, in or on wall, modular or the like) for most all applications, as desired. These and other advantages of the invention will be apparent as the following description proceeds with reference to the accompanying drawings.

DESCRIPTION OF THE PREFERRED EMBODIMENTS

Figure 1:
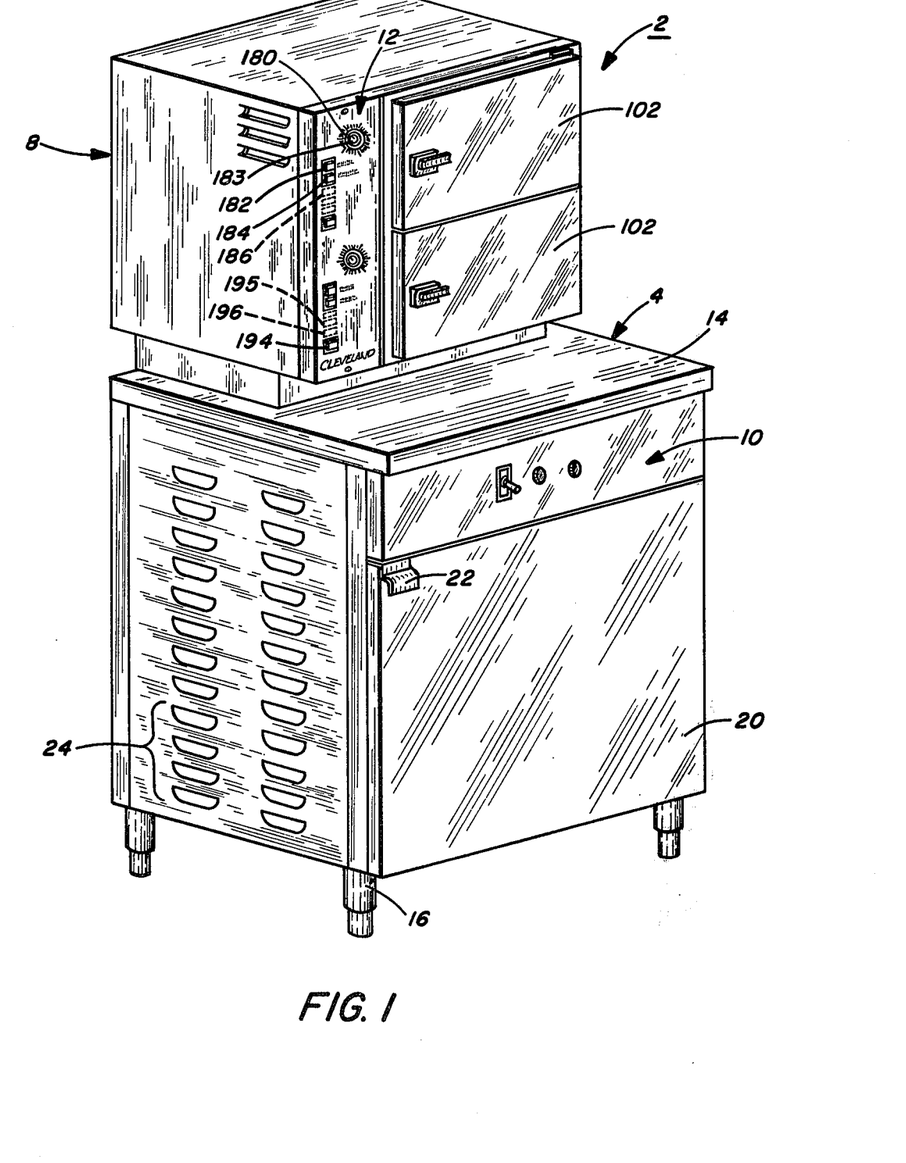
FIG. 1 is a generally perspective view illustrating the convection steamer apparatus of the present invention.
Figure 2:
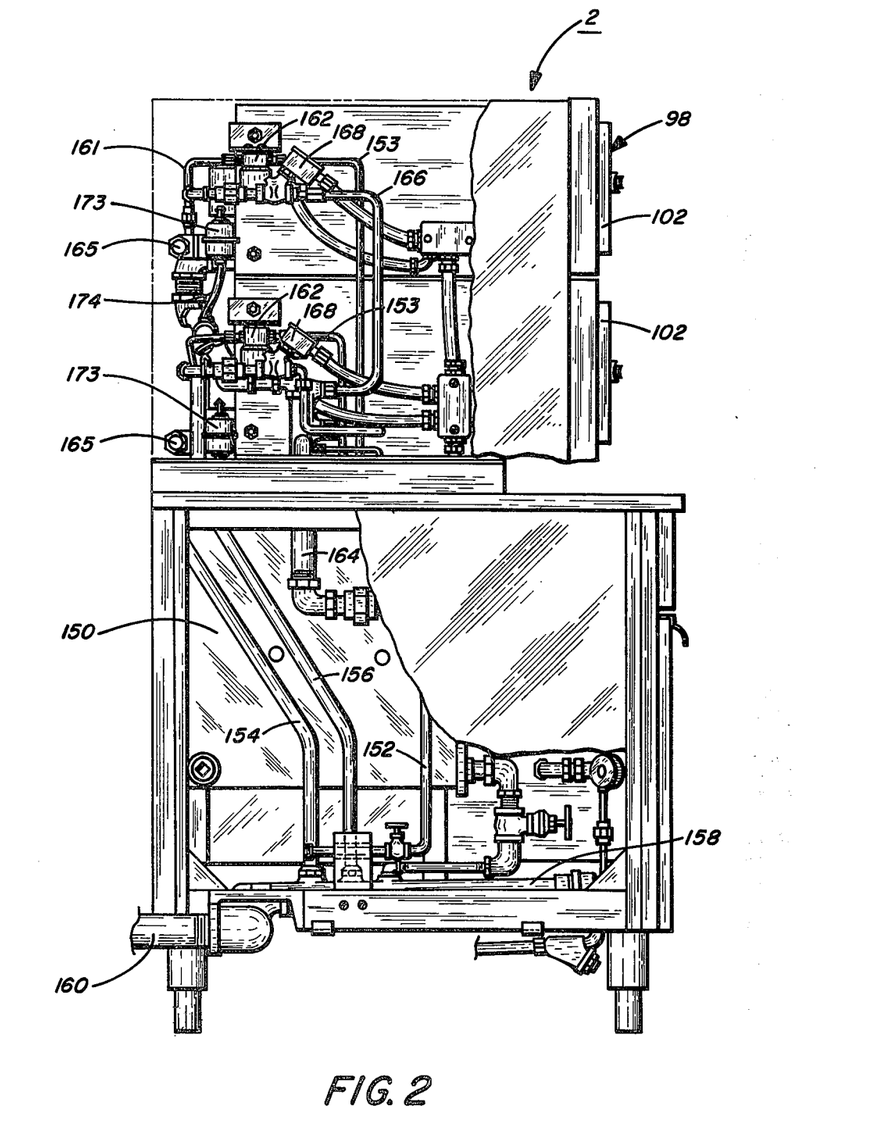
FIG. 2 is a side elevation view, partly in section illustrating one side of the apparatus shown in FIG. 1.
Figure 3:
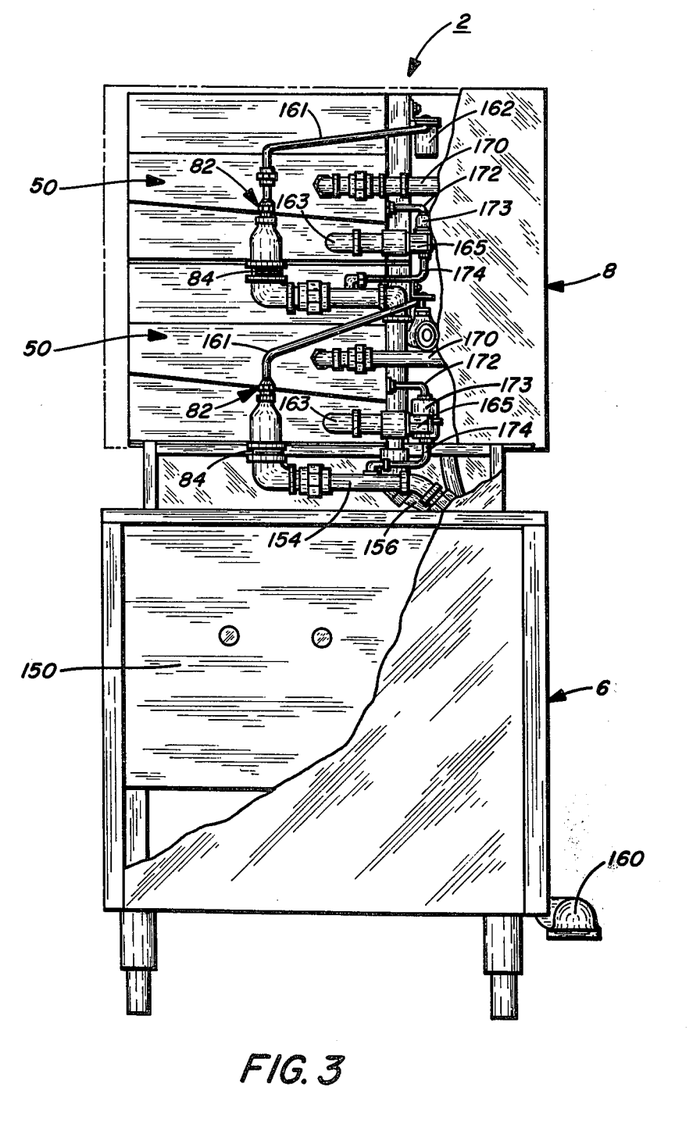
FIG. 3 is a rear elevation view, partly in section of the apparatus shown in FIG. 1.

Referring again to the drawings, in particular to FIGS. 1 to 3 thereof, there is shown a convection steamer apparatus, designated generally at 2, which includes a frame or cabinet 4 which includes a base or lower section 6 which provides a housing for a steam generating system for the cabinet and an upper or cooking section 8. In the embodiment shown, the lower section 6 includes a generally horizontally disposed control panel 10 with various control components, while the upper cabinet section 8 includes a generally vertically disposed control panel 12 with corresponding control components. The lower section 6, in the embodiment shown, includes a generally horizontal counter or deck portion 14 which affords a convenient area for readily storing containers or the like as desired. Further, the lower section 6 may be conveniently provided with adjustable legs 16 for varying the vertical height and/or levelling the apparatus for a particular application.

As shown, the upper 8 and lower 6 cabinet sections may be integrally joined together by an intermediate cabinet section 18 of reduced length and width (FIGS. 1 and 3) as compared to the upper section 8 so that the upper section overhangs the intermediate section 18 on opposite sides and at the front while being disposed flush on a common vertical plane at the rear, as best seen in FIG. 2. The lower cabinet section 6 may be provided with an access door 20 with a handle 22 to provide ready access to the interior of the cabinet for cleaning, inspection and/or maintenance, as desired. Also, the side walls of the lower section 6 may be provided with a series of vent openings, as at 24, for conveniently venting the interior of the lower section to the ambient atmosphere.

In accordance with the invention, the upper cabinet section 8 is provided with a plurality of chambers, as at 26, for receiving food items to be heated and/or cooked. Since, in the present invention, the chambers are substantially of identical construction, the following description will proceed with reference to the upper section 26 (FIGS. 4 and 5), wherein like reference numerals are employed to designate like parts. Each chamber is of a polygonal, such as a rectangular, construction defined by oppositely disposed side walls 28 and upper wall 30, and a lower or bottom wall 32. The bottom wall 32 is preferably inclined downwardly and inwardly (dotted line FIG. 4) from the associated side walls 28 to the center of the chamber and is inclined downwardly from front to rear (FIG. 5) for communication with an outlet opening 34 provided in the rear wall 33 to remove condensate and any other liquid from the bottom of the chamber. The opening 34 preferably has a diameter of 1¼ inches to give a cross-sectional area of 1.5 sq. inches to maintain the desired chamber pressure, as will hereinafter be more fully described.

As shown, each chamber is provided with a pair of oppositely disposed hanger brackets 36 detachably mounted via suitable fasteners 37, such as screws, to the side walls for removably mounting a tray for carrying food items to be heated and/or cooked. The brackets 36 may be of a fabricated wire construction having a series of laterally spaced hanger arms 38 for supporting one or more trays in selective horizontally disposed position within the chamber. A perforated grid plate 38 (FIG. 4) may be removably mounted adjacent the rear of the chamber to prevent any solid materials from entering the drainage and/or venting systems of the apparatus.

In the invention, steam is introduced into the chamber via a series of distribution tubes 40. Each tube is preferably of an elongated cylindrical construction having a plurality, such as 5, apertures 42 spaced lengthwise thereof and having a diameter determined by a No. 56 drill size for injecting steam in a jet-like flow interiorly of the chamber. As shown, a pair of distributing tubes 40 are mounted on each of the respective side walls and are preferably angularly oriented at a predetermined angle so as to impart turbulent flow to the injected steam. Preferably, the tubes are angularly oriented so that the longitudinal center lines of the respective apertures 42 are disposed at an angle in a range between 15° to 25° with the vertical. Preferably, the angle of orientation of the apertures is 15°. In the preferred embodiment, one pair of tubes is angularly oriented with the apertures pointed downwardly, while the other tubes are angularly oriented with the apertures pointing upwardly with the same degree of inclination so that the injected steam is caused to flow in a controlled, counter-clockwise (FIG. 4) direction to create turbulent flow interiorly of the chamber and across the food items to be heated and/or cooked for optimum convection heat transfer between the steam source and the surface of the food. In the invention, the respective tube pairs may be angularly oriented 180° in the opposite direction to produce turbulent steam flow in a clockwise direction to accomplish similar results. With the counter-clockwise steam flow, for example, the primary components of the injected steam are directed downwardly and inwardly along the opposite side wall and deflected off the top wall in a generally oblate turbulent path without direct impingement on the food items to be heated or cooked.

In the invention, saturated steam to be injected from the apertures 42 is at a pressure in the range from 10 (psig) to 15 (psig) and a temperature in the range from approximately 240° F to 250° F with a pressure of 12 (psig) at a temperature of approximately 244° F being preferred. Upon injection, the steam expands across the apertures so as to be throttled to a chamber pressure of substantially zero (e.g., 14.7 p.s.i.a.) to provide superheated steam in the temperature range from 232° to 240° F with the temperature being approximately 236° F for the preferred pressure of 12 (p.s.i.g.).

The distribution tubes 40 are preferably made of a good corrosion resistant material, such as stainless steel or the like. As shown, each of the tubes may be provided with a detachable plug end 44 (FIG. 5) to enable the tube to be cleaned or maintained, as desired. The other ends of the tubes 40 may be detachably mounted via apertures 46 (FIG. 5) in the rear wall 33 by mounting blocks 48 fixedly attached to the rear wall to threadably mount the tubes.

Figure 5:
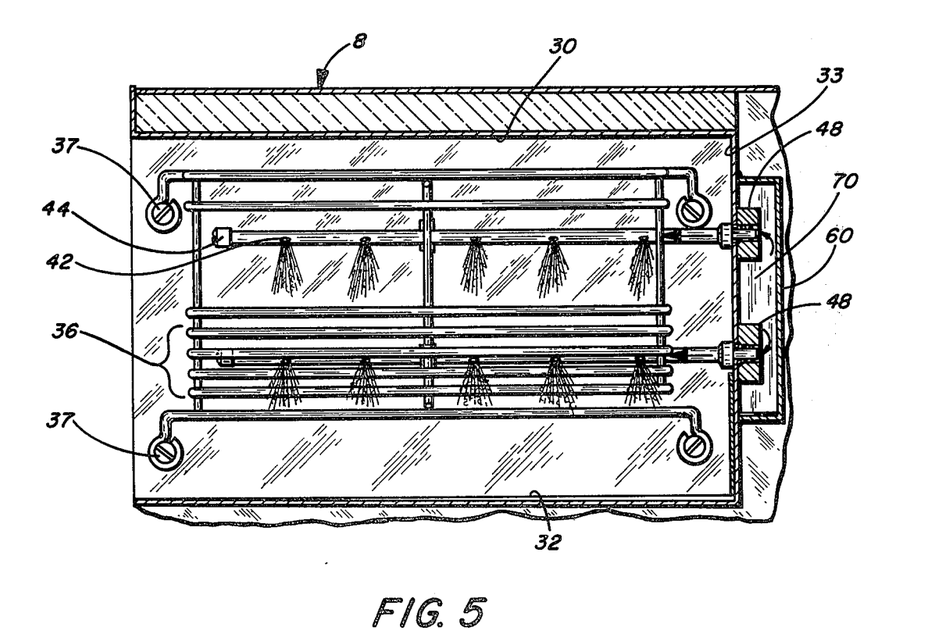
FIG. 5 is a vertical section view, with the tray of FIG. 4 removed, taken generally along the line 5—5 of FIG. 4.
Figure 10:
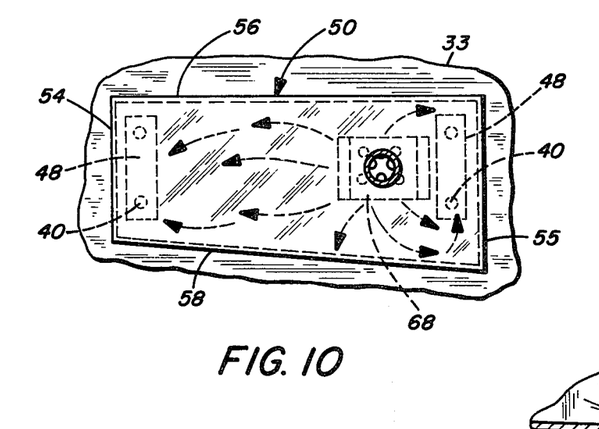
FIG. 10 is a fragmentary rear elevation view of the fluid diffuser assembly of the present invention.
Figure 11:
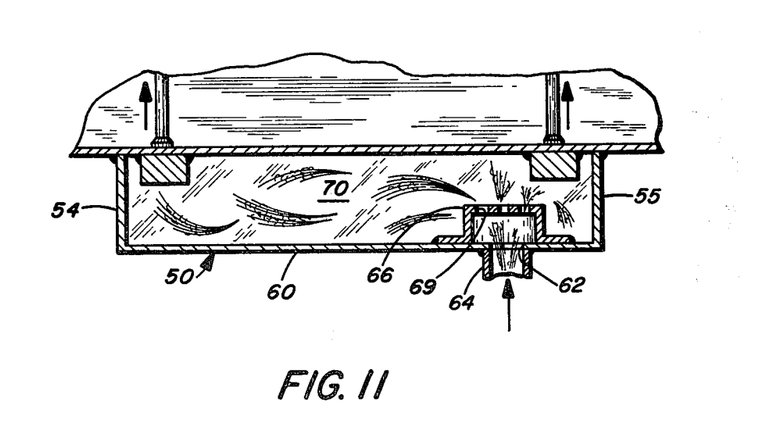
FIG. 11 is a fragmentary, horizontal section view, on an enlarged scale taken generally along the line 11—11 of FIG. 10.

There is provided in the invention a fluid diffuser assembly, designated generally at 50, which communicates with the distribution tubes 42 exteriorly of the chamber. As best seen in FIGS. 5, 10 and 11, the assembly 50 comprises a hollow housing 52 of an irregular polygonal construction defined by parallel short 54 and long 55 side walls, a right angle top wall 56, an inclined bottom wall 58 and an inner connecting front or cover wall 60 which provides a closure over the open ends of the distribution tubes 42. The cover 60 is provided adjacent one end with an inlet opening 62 (FIG. 11) which communicates with an inlet type 64 for communicating with the steam source of the present invention. The inlet opening 60 is bridged by a diffuser plate 66 which is open at both ends and which is defined by generally L-shaped side walls 67 secured, as by weldments, to the cover 60 and a planar grid wall 68 having a plurality of symmetrically arranged apertures 69 extending therethrough for diffusing and providing an impingement surface for steam entering the cavity 70 (FIG. 11) defined by the housing 52. By this arrangement, steam entering the cavities 70 impinges upon the under surface of the grid plate 66 for removal and separation of condensate and to diffuse the steam linearly (FIG. 10) and laterally (FIG. 11) outwardly into the cavity 70 for direct communication with the distribution tubes 40 so that steam substantially free of liquid may be injected from the tubes into the chamber. Condensate can collect on the bottom wall 58 for drainage therefrom as hereinafter will be more fully described. In another form, the diffuser plate 66 may be of an imperforate construction so that the grid wall 68 is solid, whereby steam flow is directed laterally outwardly from the open ends into the cavity 70, as aforesaid.

Figure 4:
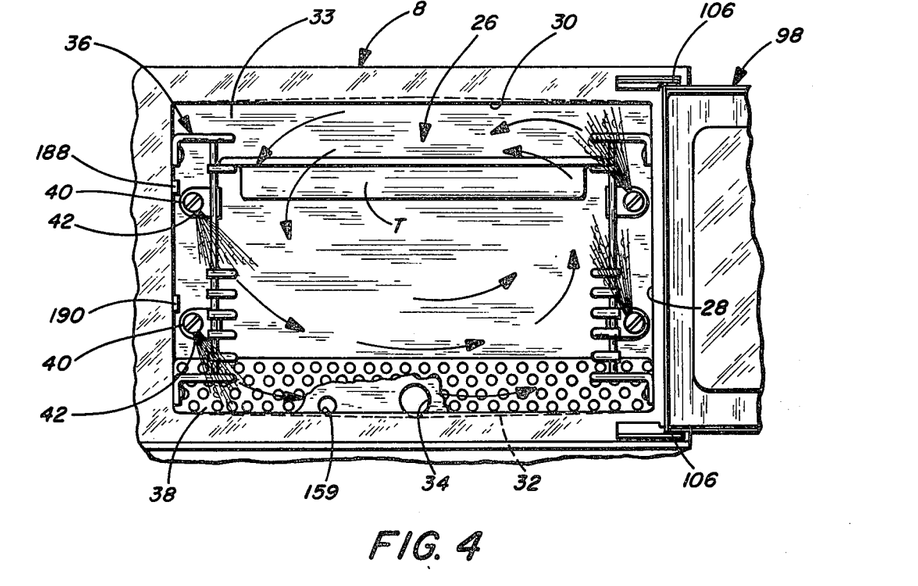
FIG. 4 is a fragmentary front elevation view with parts broken away, illustrating one of the steam convection chambers with the door open for purposes of clarity.
Figure 9:
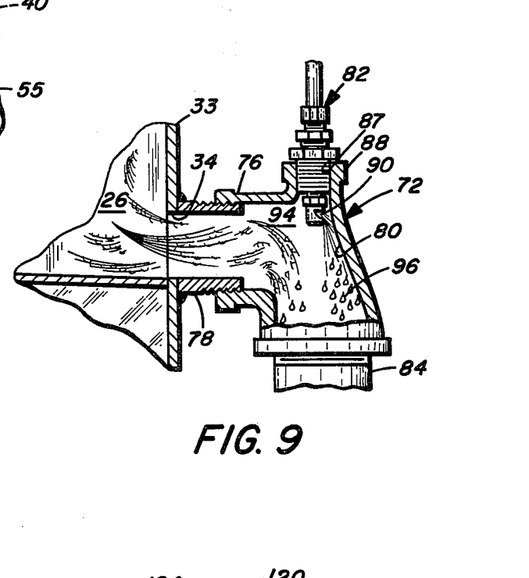
FIG. 9 is a fragmentary side elevation view, partly in section, on an enlarged scale showing the pressure reduction assembly of the invention.
Figure 12:
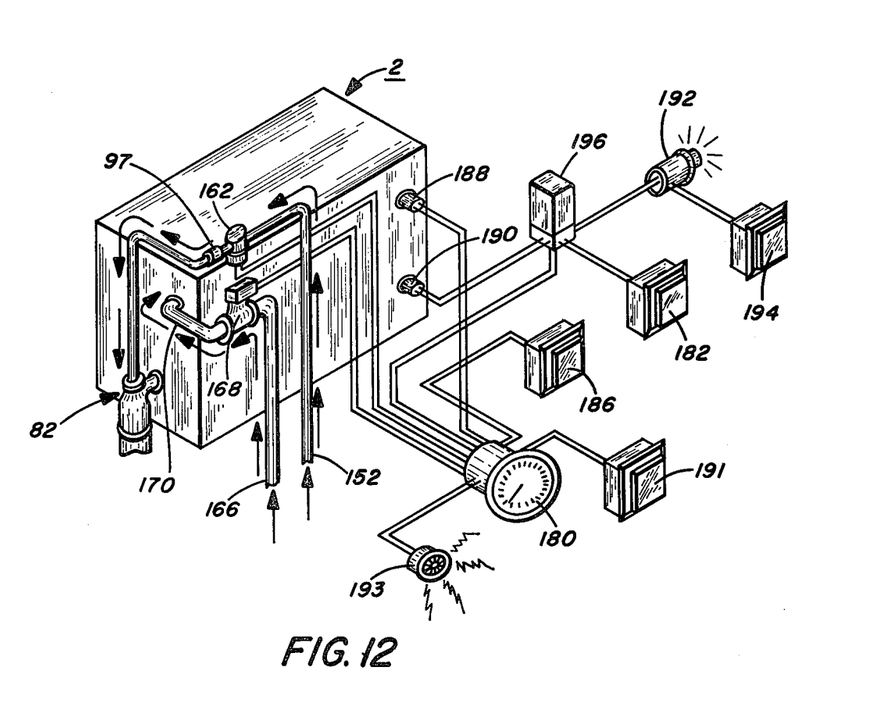
FIG. 12 is a generally perspective view schemmatically illustrating a preferred control system for the convection steamer apparatus of the present invention.

As noted in respect to FIG. 4, the outlet opening 34 provides a drain for fluid communication with a pressure differential generator, designated generally at 72, located downstream of the chamber for removal of condensate and unused steam from the bottom of the chamber 26. In a preferred form, the generator 72 includes a hydro-siphonic device which comprises a dome-like head 74 which may be threadably connected via an integral nipple 76 to a stub pipe 78 attached to the rear wall 33. The head 74 is defined by a curved side wall 80 which curves (FIG. 9) smoothly downwardly and outwardly away from an inlet ejector 82 toward a communicating drain pipe 84. The ejector 82 includes a coupling 86 threadably connected, as at 87, to an inlet end 88 of the head. The ejector is provided with a spray nozzle 90 communicating with the coupling 86 which has a recessed slot-like aperture 92 for ejecting water onto the confronting surface of the side wall 80 for deflecting inner mixing action with the steam introduced into the cavity 94 of the head. Water ejected into the cavity 94 preferably has a cold water line, such as 40° to 70° F temperature and a pressure of approximately 15 (p.s.i.g.). The ejector 82 may communicate with an automatic flow regulator 97 (FIG. 12) located downstream of the control solenoid 162 for automatically controlling flow of cold water via nozzle 90 into the cavity 94 so as to maintain the predetermined negative pressure in the cavity.

By the foregoing, the intermixing action between the cooling spray water and the unused steam causes condensation of the steam into droplets, as at 96, which induces a pressure differential between the chamber 26 and the lead cavity 94. Preferably, it has been found in the invention that, by providing a pressure in the cavity 94 in the range from approximately 0.05 p.s.i. to 0.20 p.s.i. below atmospheric pressure, the pressure within the chamber may be maintained at substantially atmospheric pressure (e.g., 14.7 p.s.i.a.). This negative pressure differential maintains the chamber pressure at a predetermined low constant value (e.g., atmospheric)

to continuously generate superheated steam within the chamber upon expansion of the saturated steam into the chamber, and conjointly maintains turbulent flow of the superheated steam for maximum convection heat-transfer around the food items to be cooked. At the preferred pressure of 12 (p.s.i.g.) and superheated steam temperature of 236° F, the effective cooking temperature in the immediate vicinity around the food to be cooked is approximately 212° F. It is believed that this optimum cooking temperature is brought about, in part, by reason that the superheat of the vapor is removed by the turbulent flow, convection heat-transfer between the vapor and the liquid film surface on the food, thereby to effectively cook the food at the lowest practical temperature (e.g., 212° F) at atmospheric, or zero pressure.

Figure 6:
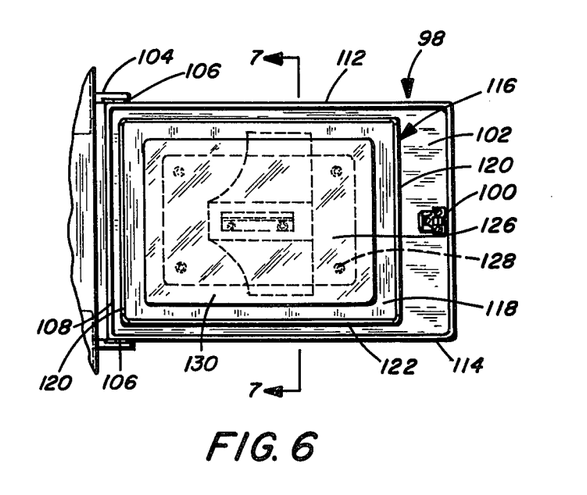
FIG. 6 is a fragmentary side elevation view of one of the novel closure assemblies for the apparatus in an open position.
Figure 7:
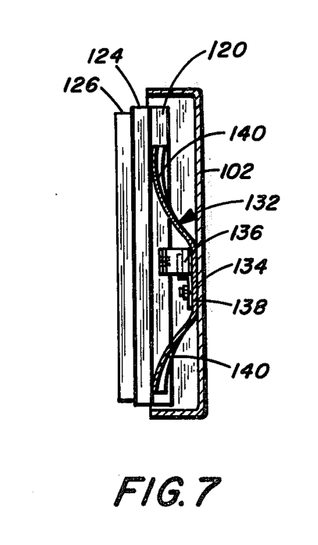
FIG. 7 is a vertical section view on an enlarged scale taken along the line 7—7 of FIG. 6.
Figure 8:
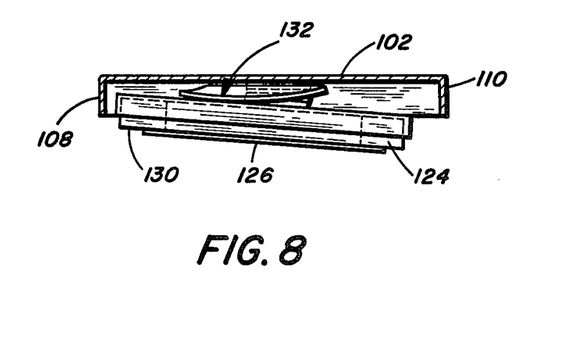
FIG. 8 is a top plan view, partly in section, looking down on FIG. 7.

In the invention, each of the chamber 26 is hermetically sealed for convection steam heating and/or cooking by a closure assembly, designated generally at 98, operable by a latch-type handle mechanism 100, as best seen in FIGS. 6–8. As shown, the assembly 98 includes a door 102 hinged via brackets 104 to the upper cabinet section, as at 106, for pivotal opening and closing movement. The door 102 is of a hollow construction, being of a polygonal, such as rectangular, configuration defined by upstanding oppositely disposed, parallel side walls 108 and 110 and upstanding oppositely disposed, parallel upper 112 and lower 114 side walls, which together provide a closure of greater dimension than that of the corresponding cross-sectional dimension of the chamber 26. A sealing plate mechanism 116 is pivotally and resiliently mounted interiorly of the door 102 for pressure sealing engagement over the open end of the chamber. As shown, the mechanism 116 includes a base plate 118 of polygonal, such as rectangular, configuration disposed in laterally off-set relation in respect to the door 102. The plate 118 is defined by upstanding oppositely disposed, parallel end walls 120 and oppositely disposed parallel upper and lower walls 122 which together provide a recess for mounting a heat resilient elastomeric material (rubber or the like) in the form of a resilient pad 124. A deflector plate 126 is superimposed over the pad 124 and is secured to the door 102 via suitable fasteners, as at 128 for holding the pad in position. The plate 126 is preferably of a corrosion-resistant metal, such as stainless steel or the like, and is dimensioned slightly smaller than the size of the chamber opening so as to provide an endless peripheral sealing margin 130. The margin 130 is defined by an exposed portion of the resilient pad 124 so as to provide a pressure sealing engagement around the confronting marginal edges of the opening into the chamber 26.

In the embodiment shown, the sealing plate mechanism 116 is pivotally and resiliently mounted via a transverse leafspring 132 secured to the door 102 via a bracket 134. The base plate 118 of the mechanism 116 is, in turn, pivotally mounted via a bracket 136 to the bracket 134. The spring 132 is of a generally U-shaped configuration (FIG. 7) in cross-section defined by a bight portion 138 and a pair of integral upwardly and outwardly flared wing portions 140 disposed for coacting biasing engagement with the confronting under surface of the base plate 118. The wing portions 140 are generally convexly curved in the lengthwise direction (FIG. 8) of the door 102 for resilient coacting engagement with the undersurface of the base plate 18 upon closing of the door. The closure is shown in the open end unbiased position (FIG. 8) so that the sealing plate mechanism 116 is canted in an angularly outward position ready for pivotal swinging movement outwardly about the pivotal bracket connection 136 so as to be disposed in closed sealing engagement with the confronting surfaces of the chamber opening upon locking engagement of the door. Accordingly, as the door is pivotally closed, the near edge of the pad at the margin 130 initially contacts the confronting edge of the chamber opening with continued closing movement resiliently biasing the sealing mechanism 116 and, hence, the deflector plate 126 into parallel confronting alignment with the chamber opening so as to bring the sealing margin 130 of the pad 124 into tight fluid sealing engagement in the final closed position of the door. The sealing plate mechanism 116 is removable and fully insulated, so that the exterior of the door remains relatively cool to the touch. The door seals automatically when closed and may be opened at any time with the touch of a finger due to the atmospheric cooking process.

In the invention, steam is supplied under pressure to the distributor tube 40 via a steam generator system located in the lower cabinet section 6. As shown, the system includes a boiler and combustion unit 150 (FIGS. 2 and 3). Water may be introduced into the system via suitable piping at any convenient line pressure as may be available, such as between about 35 p.s.i. to 60 p.s.i.

Cooling water at cold water line temperature is delivered via line 152 and line 153 through solenoid actuated condenser valves 162 (FIG. 2) and via lines 161 (FIG. 3) to the respective hydro-siphonic ejector devices 82 for intermixing condensing action with the steam received via opening 34 (FIG. 4) provided at the bottom rear of the chamber 26. Condensate is then removed via piping 84 to drain lines 154 and 156 to the outlet drain 160.

Steam from the boiler 150 is delivered via a steam manifold 164 (FIG. 2) to a common steam pipe 166 and through solenoid actuated valves 168 and piping 170 (FIG. 3) for delivery via the inlets 62 (FIG. 11) of the respective diffuser devices for introducing substantially dry steam into the distribution tubes 40. Condensate is removed from the bottom of the respective diffuser housings via outlet pipes 172 through thermostatic drain steam traps 173 and then through drain pipes 174 for discharge through the drains 154 and 156, as seen in FIG. 3. The traps 173 act to drain condensate and force the diffuser cavities 70 so as to maintain the cavities at substantially atmospheric pressure. Each of the chambers 26 may be provided at their bottom with a pressure relief opening 159 (FIG. 4) which communicates with relief valves 165 for venting to atmosphere at approximately 0.5 (p.s.i.g.) to reduce chamber pressure in the event of over pressurization thereof.

As diagrammatically illustrated in FIG. 11, the convection steam apparatus may be provided with a control system including an automatic electric with audible signal timer 180 which may register, for example, 0 to 30 minutes which may be pre-set for the desired cooking cycle. The cycle is commenced by actuating an on-off push button 182, whereupon a timer by-pass button 184 is actuated. Actuation of the button 182 energizes a cooking light 186 behind the panel 12 and simultaneously actuates the water and steam solenoids 162 and 170 to deliver cooling water to the hydro-siphonic ejectors 82 and steam under pressure via the diffusers to the distribution tubes 40 for delivery into the respective chambers 26. The interior of the chamber 26 may be provided with a thermostatic switch 188 (FIGS. 4 and 11) connected in circuit with the timer 180 which may control actuation of the timer dependent upon the temperature within the chamber. For example, it may be predetermined that the timer does not commence its count-down until after the switch has reached a predetermined temperature. Upon completion of a predetermined cooking cycle, the timer 180 will have automatically rotated to the predetermined setting, whereupon the timer start button 183 pops out and actuates solenoids 162 and 168 which, in turn, energizes another light 191 which indicates completion of the cooking cycle. Simultaneous with this action, an audible control on the timer, such as a buzzer 193, may be actuated to give an audible indication of completion of the cooking cycle, and another light 195 behind the panel 12 is energized to indicate completion of the cooking cycle. The system may be provided with a pressure responsive switch 190 (FIGS. 4 and 11) which actuates relay 196 and warning light 192 which automatically indicates any excessive pressure buildup within the chamber. For example, the relay may be pre-set so as to actuate the steam solenoid 168 in the event the chamber pressure exceeds 1 p.s.i. which automatically turns off the system. The system would again be activated by actuation of the re-set button 194.

In the invention, each of the chambers, as at 26, is independently controlled by its own compensating timer, as at 180. Hence, as the process is carried out at substantially atmospheric pressure, the doors may be opened at any time, without interrupting the cooling process. It is to be understood, therefore, that any number and/or arrangement of cooling chambers may be utilized, as desired.

We claim:
1. A convection steamer apparatus having improved heat-transfer characteristics for processing food items or the like comprising,
   at least one steam chamber defined by a bottom, top, rear and oppositely disposed side walls adapted to receive food items in supported relation therein,
   steam generator means for supplying regulated amounts of steam under pressure into said chamber,
   distribution means including a plurality of spaced-oppositely disposed pipe means disposed adjacent associated of said side walls adapted to deliver substantially dry steam in a generally orbital path around food items to be processed within said chamber,
   diffuser means operably connected to said steam generator means and directly communicating with said distribution means for introducing substantially dry steam into said distribution pipe means, and
   pressure differential generator means communicating with said chamber exteriorly thereof for inducing a substantially zero pressure in said chamber by removing air and unused steam from said chamber by condensing said steam with liquid pressure thereby to induce turbulent flow of said substantially dry steam in said orbital path during the processing of said food items.

2. A convection steamer in accordance with claim 1, wherein said distribution means includes a plurality of spaced, operably disposed pipes extending parallel to said side walls on opposite sides of the supported food items to be processed, and
   said pipes each including a plurality of laterally spaced apertures which are generally oppositely angularly oriented to deliver said substantially dry steam in said orbital path interiorly of said chamber.

3. A convection steamer apparatus in accordance with claim 1, wherein,
   said diffuser means includes a hollow housing mounted exteriorly of said chamber having inlet means communicating with said steam generator means and outlet means communicating with said distribution means, and
   grid means disposed in bridging relation between inlet and outlet means for diffusing received steam and for removing formed condensate to introduce substantially dry steam into said distribution means.

4. A convection steamer apparatus in accordance with claim 3, including,
   drain means operably connected to said housing adapted for removal of condensate from said steam.

5. A convection steamer apparatus in accordance with claim 1, wherein,
   said pressure differential generator means includes a hydro-siphonic means having a body member having a fluid passageway extending therethrough with inlet means communicating with said chamber and outlet means adapted for delivery to a drain, and
   fluid ejector means for ejecting a fluid cooling medium into said passageway for intermixing action with said steam received from said chamber adapted to condense said steam into liquid for delivery to said drain.

6. A convection steamer apparatus in accordance with claim 5, wherein,
   said ejector means includes an ejector nozzle for delivering cooling water in spray-like form into said passageway to induce a negative pressure differential between said chamber and said passageway for continuously purging air and/or unused steam from said chamber.

7. A convection steamer apparatus in accordance with claim 5, wherein,
   said hydro-siphonic means includes a fluid ejector means for ejecting a cooling medium for intermixing action with steam received from said chamber for condensing said steam into liquid form to induce said pressure differential, and
   control means operably connected to said fluid ejector means for maintaining said pressure differential at a predetermined value.

8. A convection steamer apparatus in accordance with claim 7, including,
   time responsive control means having a predetermined timing cycle adapted for actuating said control means.

9. A fluid diffuser device in combination with a convection steamer apparatus of the type having a heating chamber comprising,
   a hollow housing mounted exteriorly of said chamber for direct communication with a fluid distribution system disposed interiorly of said chamber, said housing including inlet means adapted to transmit fluid under pressure interiorly of said housing,
a perforated diffuser member disposed in bridging relation over said inlet means interiorly of said housing for the removal and separation of condensate from steam delivered to said housing,
said diffuser member being of a generally inverted U-shaped configuration, in side elevation, defined by upstanding side walls connected at one end to said housing and a perforated grid wall made integrally with the opposed ends of said walls, and
said diffuser member being open at the opposed ends with a plurality of perforations therein for diffusing fluid laterally outwardly through said open ends and outwardly through said perforation.

10. A fluid diffuser device in accordance with claim 9, wherein
said fluid distribution system includes a plurality of distribution tubes directly communicating at one end interiorly of said housing and extending in a direction toward their other ends into said chamber.

11. A hydro-siphonic device adapted to be attached to the exterior of a convection steamer apparatus of the type having a heat processing chamber adapted for inducing a siphonic pressure differential in said chamber comprising,
a hollow head member having a fluid flow passageway with an inlet opening for receiving fluid from said chamber and an outlet opening for removal of fluid from said passageway, said head including a downwardly and outwardly curved side surface defining a portion of said passageway, and
ejector means disposed interiorly of said head and communicating with said passageway and onto said outwardly curved side surface for discharging liquid in the form of a spray into said passageway for intermixing action with steam received from said chamber whereby said steam is condensed into liquid form for maintaining a negative pressure differential between said passageway and said chamber for maintaining a substantially zero pressure in said chamber.

12. A hydro-siphonic device in accordance with claim 11, wherein said head includes a generally dome-like head adapted for
threadable connection for communication with the interior of said chamber, and
said ejector means including a spray nozzle disposed at right angles to said inlet opening adapted for ejecting a cooling medium downwardly through said passageway toward said outlet opening for intermixing action between said cooling medium and any unused steam so as to induce a pressure differential between said chamber and said passageway so as to maintain said chamber at substantially zero pressure.

* * * * *